United States Patent
Haapaniemi

(10) Patent No.: US 9,496,753 B2
(45) Date of Patent: *Nov. 15, 2016

(54) CONTROL ARRANGEMENT AND METHOD FOR SUPPLYING ELECTRICAL POWER IN AN ELEVATOR SYSTEM

(71) Applicant: KONE Corporation, Helsinki (FI)

(72) Inventor: Markku Haapaniemi, Helsinki (FI)

(73) Assignee: KONE CORPORATION, Helsinki (FI)

( * ) Notice: Subject to any disclaimer, the term of this patent is extended or adjusted under 35 U.S.C. 154(b) by 504 days.

This patent is subject to a terminal disclaimer.

(21) Appl. No.: 13/936,473

(22) Filed: Jul. 8, 2013

(65) Prior Publication Data

US 2013/0293019 A1 Nov. 7, 2013

Related U.S. Application Data

(63) Continuation of application No. PCT/FI2012/050033, filed on Jan. 16, 2012.

(30) Foreign Application Priority Data

Jan. 25, 2011 (FI) ..................................... 20115068

(51) Int. Cl.
*H02J 9/00* (2006.01)
*B66B 1/34* (2006.01)
*B66B 5/02* (2006.01)
*G05B 9/00* (2006.01)
*B66B 19/00* (2006.01)

(52) U.S. Cl.
CPC ................ *H02J 9/005* (2013.01); *B66B 1/34* (2013.01); *B66B 5/02* (2013.01); *B66B 19/007* (2013.01); *Y10T 307/625* (2015.04)

(58) Field of Classification Search
CPC ........................................................ G05B 9/00
USPC ............................................................ 307/86
See application file for complete search history.

(56) References Cited

U.S. PATENT DOCUMENTS

| | | | |
|---|---|---|---|
| 4,013,993 | A | 3/1977 | Mandel et al. |
| 7,866,446 | B2 | 1/2011 | Lindegger |
| 2004/0035646 | A1 | 2/2004 | Araki |
| 2004/0188182 | A1 | 9/2004 | Walters et al. |
| 2010/0066248 | A1* | 3/2010 | Mattila ..................... B66B 1/34 315/76 |

FOREIGN PATENT DOCUMENTS

JP 8-245090 A 9/1996
WO WO 2008/135627 A1 11/2008

* cited by examiner

*Primary Examiner* — Robert DeBeradinis
(74) *Attorney, Agent, or Firm* — Birch, Stewart, Kolasch & Birch, LLP

(57) ABSTRACT

A control arrangement and to a method for supplying electrical power in an elevator system are disclosed. The control arrangement includes a sensor detecting movement of an elevator car and also a control of the lighting of the elevator car. The control of the lighting of the elevator car is configured to control the emergency lighting of the elevator car on the basis of movement data of the elevator car expressed by the sensor detecting movement of the elevator car.

22 Claims, 3 Drawing Sheets

CONTROL ARRANGEMENT AND METHOD FOR SUPPLYING ELECTRICAL POWER IN AN ELEVATOR SYSTEM

CROSS REFERENCE TO RELATED APPLICATIONS

This application is a Continuation of PCT International Application No. PCT/FI2012/050033 filed on Jan. 16, 2012, which claims priority under 35 U.S.C. §119(a) to Patent Application No. 20115068 filed in Finland on Jan. 25, 2011, all of which are hereby expressly incorporated by reference into the present application.

FIELD OF THE INVENTION

The invention relates to solutions for supplying electrical power in an elevator system, more particularly in connection with the reserve power drive of an elevator.

BACKGROUND OF THE INVENTION

The supply of electrical power to the various devices of an elevator system usually occurs during normal operation of the elevator from an electricity network. In connection with a malfunction of the electricity network, such as an electricity outage or a voltage reduction, the elevator system is switched to reserve power mode, in which case electrical power is supplied to the elevator system from a reserve power source, such as from a reserve power generator, from a battery, et cetera. The operation of the elevator system can continue without interruption also in reserve power mode during a malfunction of the electricity network, if the reserve power source is dimensioned to supply electrical power according to the requirement of normal operation of the elevator. Normal operation of the elevator can also be discontinued in reserve power mode; however, also in this case electrical power must be supplied to selected points, such as to the emergency lighting of the elevator car.

The capacity of the reserve power source, such as of the generator or battery, needed in the reserve power mode of an elevator system might grow to be high, especially if the reserve power source must be dimensioned to supply electrical power during a long-lasting malfunction of the electricity network. Since, on the other hand, in elevator systems, both in elevator systems with a machine room and those without a machine room, the space requirement of a reserve power source may form a problem, it is endeavored to dimension the reserve power source to be as small as possible in its capacity. These two mutually conflicting requirements might result in, inter alia, overloading of the reserve power source or a breakdown of operation.

AIM OF THE INVENTION

The aim of the invention is to provide a solution to the problem for improving the operating capacity of a reserve power source of an elevator. To achieve this aim the invention discloses a control arrangement according to claim 1, a control unit according to claim 9, a method according to claim 13, a method according to claim 14 and also a method according to claim 18. The preferred embodiments of the invention are described in the dependent claims. Some inventive embodiments and inventive combinations of the various embodiments are also presented in the descriptive section and in the drawings of the present application.

SUMMARY OF THE INVENTION

The control arrangement according to the invention comprises a sensor detecting movement of an elevator car and also control means of the lighting of the elevator car. The control means of the lighting of the elevator car are configured to control the emergency lighting of the elevator car on the basis of movement data of the elevator car expressed by a sensor detecting movement of the elevator car. In a preferred embodiment of the invention the control means of the lighting of the elevator car are further configured to control the interior lighting of the elevator car on the basis of movement data of the elevator car expressed by a sensor detecting movement of the elevator car. In a preferred embodiment of the invention a reserve power source is fitted in connection with the emergency lighting of the elevator car. In a preferred embodiment of the invention the control means of the lighting are configured to control the power supply occurring to the emergency lighting of the elevator car from the reserve power source on the basis of movement data of the elevator car expressed by a sensor detecting movement of the elevator car. Consequently, according to the invention by controlling the emergency lighting of the elevator car, the electricity consumption of the lighting can be adjusted, preferably restricted, in the reserve power mode of an elevator. By adjusting/restricting the electricity consumption of the lighting, it is also possible to ensure that the power consumption/energy consumption of the lighting does not exceed the electricity supply capacity of the reserve power source, in which case the risk of the overloading of the reserve power source and/or of a breakdown of operation decreases. Since in the solution according to the invention the emergency lighting of the elevator car is controlled on the basis of movement data of the elevator car, the control of the emergency lighting can be implemented as a control device that is separate from the rest of the elevator control system, which control device is easy to dispose in connection with the elevator system also by retrofitting, e.g. in connection with modernization of the elevator.

In a preferred embodiment of the invention the sensor detecting movement of the elevator car is an acceleration sensor, which is fitted in connection with the elevator car. In some embodiments of the invention the sensor detecting movement of the elevator car is configured to detect both horizontal movement and vertical movement of the elevator car. By means of the solution according to the invention the lighting of the elevator car can be controlled on the basis of collecting movement information of the elevator car with a sensor, such as on the basis of receiving information about the arrival/exit of an elevator passenger and also about the movement of the passenger in the elevator car. In some embodiments of the invention the lighting of the elevator system comprises interior lighting of the elevator car and emergency lighting of the elevator car that are separate to each other. In some other embodiments of the invention the interior lighting and the emergency lighting are implemented at least partly with shared light sources. In the most preferred embodiment of the invention the emergency lighting of the elevator car is implemented using one or more LED light sources.

In a preferred embodiment of the invention the control arrangement comprises means for determining the operating state of the primary electricity supply of the elevator car. In the most preferred embodiment of the invention the electricity supply to the elevator car occurs from the primary electricity supply during normal operation of the primary electricity supply and from the reserve power source in connection with a functional nonconformance of the primary electricity supply. In the most preferred embodiment of the invention the public electricity network functions as the primary electricity supply. In a preferred embodiment of the invention the control means of the lighting of the elevator car are configured to control the lighting of the elevator car on the basis of the operating state of the primary electricity supply of the elevator car. In some embodiments of the invention, the means for determining the operating state of the electricity supply of the elevator car are configured to measure the voltage in the supply cables of the primary electricity supply. The control arrangement is configured to isolate the primary electricity supply from the electricity supply circuit of the lighting of the elevator car and also to connect the reserve power source to the electricity supply circuit of the emergency lighting when it is detected that the voltage in the supply cables has decreased more than permitted. The control means of the lighting are in this case configured to supply electrical power from the reserve power source to the emergency lighting of the elevator car in connection with a functional nonconformance of the electricity supply of the elevator car.

The control arrangement preferably comprises a charging circuit for charging the reserve power source when the primary electricity supply is operating normally. The charging circuit can be e.g. a battery charger, with which the battery of the reserve power source is charged.

The control unit according to the invention comprises a connection to the reserve power source, a reserve power source, a sensor detecting movement of the elevator car, a connection to the primary electricity supply of the elevator car, control means of the lighting of the elevator car and also a connection to the emergency lighting of the elevator car. The control means of the lighting of the elevator car are configured to control the emergency lighting of the elevator car on the basis of movement data of the elevator car expressed by a sensor detecting movement of the elevator car. The control unit according to the invention is easy to install in connection with the elevator car also by retrofitting, e.g. in connection with modernization of the elevator. This is possible for the reason, among others, that by means of the control unit according to the invention the lighting of an elevator car can be controlled without control signals coming from an external control circuit.

In some preferred embodiments of the invention, the control unit comprises a microprocessor and also a memory, in which a program to be executed by the microprocessor is stored. In this case the microprocessor is configured to control the power supply of the lighting of the elevator car In a preferred embodiment of the invention the control unit comprises a connection to the interior lighting of the elevator car, and the control means of the lighting of the elevator car are configured to control the interior lighting of the elevator car on the basis of movement data of the elevator car expressed by a sensor detecting movement of the elevator car.

In a preferred embodiment of the invention the control unit comprises means for determining the operating state of the primary electricity supply of the elevator car. The control means of the lighting of the elevator car are configured to control the lighting of the elevator car on the basis of the operating state of the primary electricity supply of the elevator car.

In the method according to the invention for modernizing the elevator a control unit according to what is disclosed above is fitted in connection with the elevator car for controlling the lighting of an elevator car.

In a second method according to the invention movement of the elevator car is measured and also the emergency lighting of the elevator car is controlled on the basis of the measured movement of the elevator car.

In a preferred embodiment of the invention the interior lighting of the elevator car is controlled on the basis of the measured movement of the elevator car.

In a preferred embodiment of the invention the operating state of the primary electricity supply of the elevator car is determined and the lighting of the elevator car is controlled on the basis of the operating state of the primary electricity supply of the elevator car. In a preferred embodiment of the invention, when determining a functional nonconformance of the primary electricity supply of the elevator car the power supply to the interior lighting of the elevator car is disconnected and the power supply to the emergency lighting of the elevator car is started.

In a third method according to the invention the supply of electrical power in an elevator system is controlled, which elevator system can be brought to different operating modes, at least to normal mode, to energy-saving mode and to reserve power mode, on the basis of selection criteria. In the method the elevator system is brought to a combined mode, in which simultaneously both reserve power mode and energy-saving mode are in force, when it is detected that both the selection criterion for reserve power mode and the selection criterion for energy-saving mode are fulfilled. In the most preferred embodiment of the invention electrical power is supplied in a controlled manner to the lighting of an elevator car. In the invention, the term normal mode refers to an operating state in which driving takes place with the elevator without the operation of the elevator being restricted by special operating criteria; the elevator can be operated in normal mode e.g. during times of busy traffic, when it is endeavored to maximize the transport capacity of the elevator. In normal mode also the primary electricity supply of the elevator system is operational. The term energy-saving mode refers to an operating state in which the energy consumption of the elevator system is reduced by decreasing the electrical power to be supplied to one or more different devices of the elevator system. The elevator system can be switched to energy-saving mode e.g. for times of quieter traffic, such as at night, at weekends, etc. The term reserve power mode refers to the operating state e.g. during a malfunction/functional nonconformance of the primary electricity supply, in which case the power supply to one or more different devices of the elevator system occurs from a reserve power source, such as with a reserve power generator, with a battery, et cetera. Therefore, according to the invention, by controlling the power supply of an elevator system, the power consumption of the elevator system can be reduced both in the reserve power mode of the elevator in a situation of disruption of the primary electricity supply and in the energy-saving mode of the elevator when the primary electricity supply is functioning normally. By reducing the power consumption, it is also possible to ensure that the power consumption does not exceed the electricity supply capacity of the reserve power source, in which case the risk of the overloading of the reserve power source and/or of a breakdown of operation decreases.

In some preferred embodiments of the invention, the selection criterion for energy-saving mode relates to the movement data of the elevator car, preferably to the data about the movement of the elevator car expressed by a sensor detecting acceleration of the elevator car. In some embodiments the selection criterion for energy-saving mode is fulfilled, and the elevator system is switched to energy-saving mode, when movement of the elevator car has not been detected for a set period of time. In some embodiments the selection criterion for energy-saving mode ceases when movement of the elevator car is again detected.

In some preferred embodiments of the invention, the selection criterion for reserve power mode relates to the operating state of the primary electricity supply of the elevator system. In some embodiments the selection criterion for reserve power mode is fulfilled when a functional nonconformance of the primary electricity supply of the elevator system is detected. In some embodiments the selection criterion for reserve power mode ceases when it is detected that the primary electricity supply of the elevator system is operational again.

In a preferred embodiment of the invention the elevator system is switched from combined mode to reserve power mode when it is detected that the selection criterion for energy-saving mode has ceased.

In a preferred embodiment of the invention the elevator system is switched from combined mode to energy-saving mode when it is detected that the selection criterion for reserve power mode has ceased.

In a preferred embodiment of the invention the elevator system is switched to normal mode when it is detected that both the selection criterion for reserve power mode and the selection criterion for energy-saving mode have ceased.

In some embodiments of the invention the control unit comprises a microprocessor, which is configured to bring the elevator system either to normal mode, to energy-saving mode, to reserve power mode, or to a combined mode of energy-saving mode and reserve power mode on the basis of selection criteria.

By means of the invention the energy consumption of a elevator system can be reduced both during normal operation of the elevator system and also during a functional nonconformance, such as during a functional nonconformance of the electricity supply of the elevator system.

The aforementioned summary, as well as the additional features and advantages of the invention presented below, will be better understood by the aid of the following description of some embodiments, said description not limiting the scope of application of the invention.

BRIEF EXPLANATION OF THE FIGURES

In the following, the invention will be described in detail with reference to the attached drawings, wherein.

MORE DETAILED DESCRIPTION OF PREFERRED EMBODIMENTS OF THE INVENTION

Figure 1:
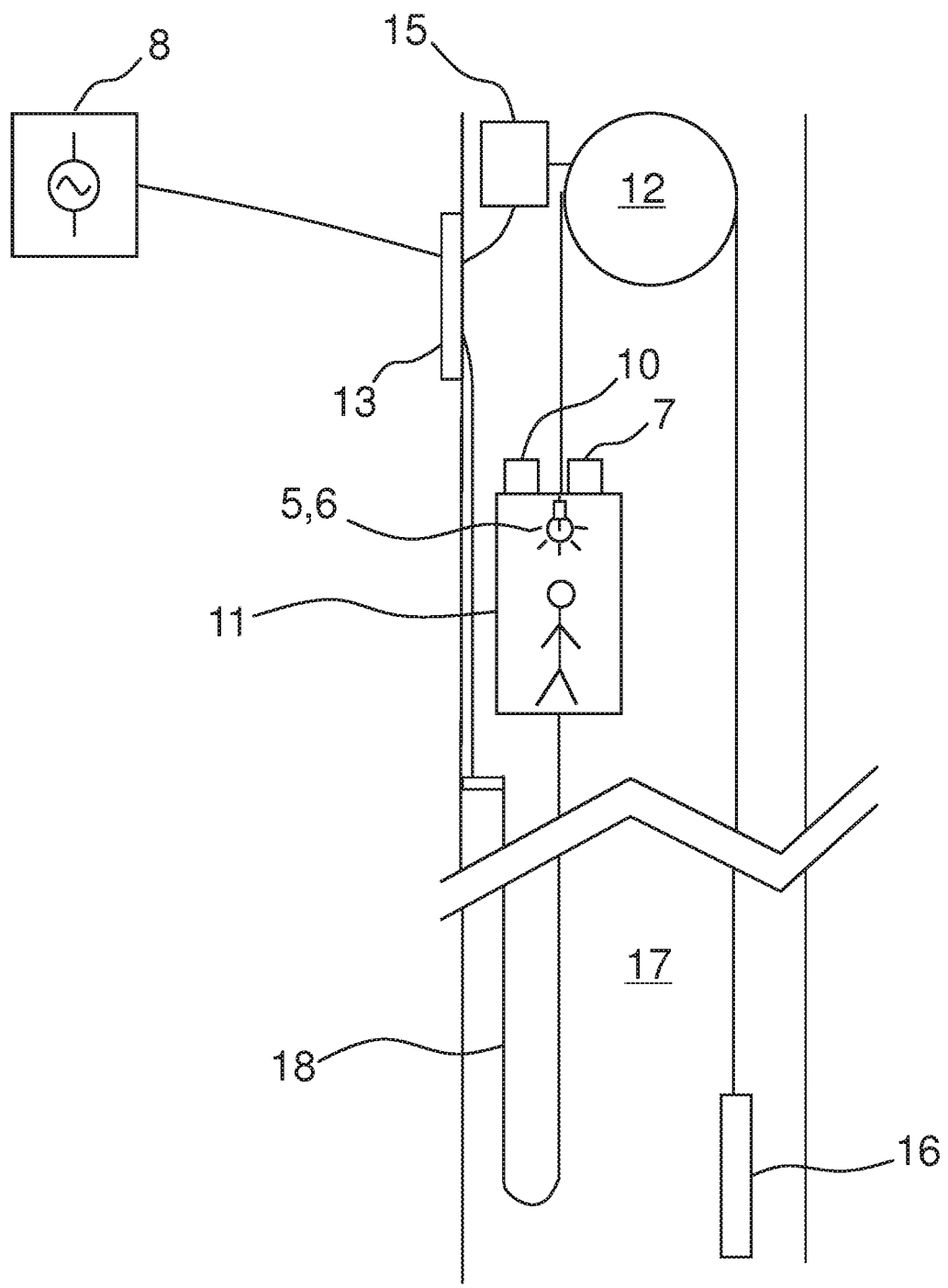
FIG. 1 presents as a block diagram an elevator system according to the invention

In the elevator system of FIG. 1, the elevator car 11 is moved in the elevator hoistway 17 with hoisting ropes passing via the traction sheave 12 of a hoisting machine. The power supply to the hoisting machine occurs from the electricity network 8 with a frequency converter 15. The supply cables of the electricity network are taken from the main distribution board to the control panel 13, which in this embodiment of the invention is disposed on a stopping floor of the elevator in connection with an entrance to the elevator hoistway. The elevator system can also be one with a machine room, and the control panel 13 can be also be disposed in the machine room; particularly old elevator systems requiring modernization of the lighting of an elevator car are often ones with a machine room. On the other hand, the control panel can be disposed also elsewhere in the elevator hoistway 17. From the control panel 13 the supply cables are taken onwards to the frequency converter 15 in the elevator hoistway 17. The electricity supply from the electricity network 8 to the elevator car 11 occurs with supply cables traveling in a trailing cable 18. The trailing cable 18 is suspended in the elevator hoistway 17. One end of the trailing cable 18 is fixed in connection with the elevator car 11 and the other end is fixed to a wall part of the elevator hoistway 11, from which wall part the electricity supply wires of the trailing cable 18 are taken onwards to the control panel 13 for connecting to the electricity distribution network 8.

In connection with the modernization work of an elevator, control means for bringing the elevator to an energy-saving mode are fitted to the elevator system. In addition, emergency lighting 6 of the elevator car according to the requirements of safety regulations have been added to the elevator system. The emergency lighting is started in connection with a malfunction of the electricity network 8, in which case the power supply to the emergency luminaire occurs from a battery 7 on the roof of the elevator car. The aforementioned functions are fitted to an elevator system without needing to essentially change the existing elevator control system. The increase in functions is implemented by fitting a control unit 10 to the roof of the elevator car, which control unit controls the lighting of the elevator car 11, both the normal interior lighting 5 of the elevator car and also the emergency light 6 installed in the elevator car.

Figure 2:
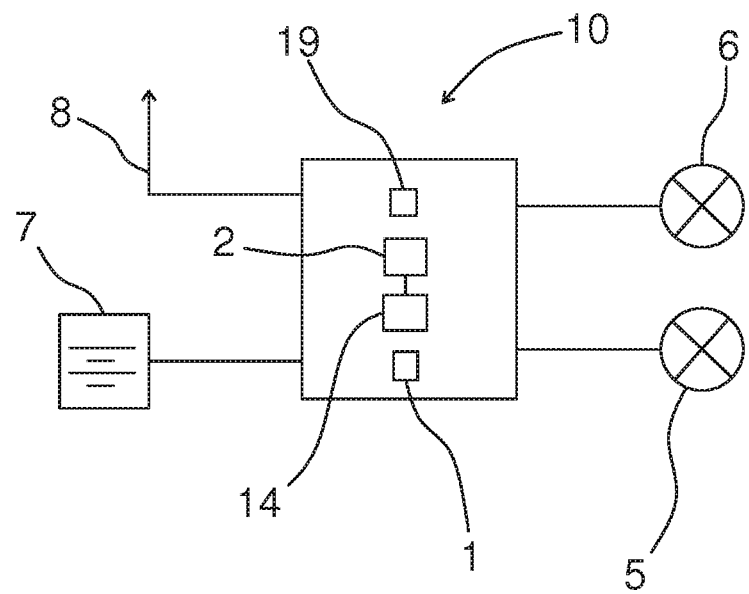
FIG. 2 illustrates a control unit according to the invention
Figure 4A:
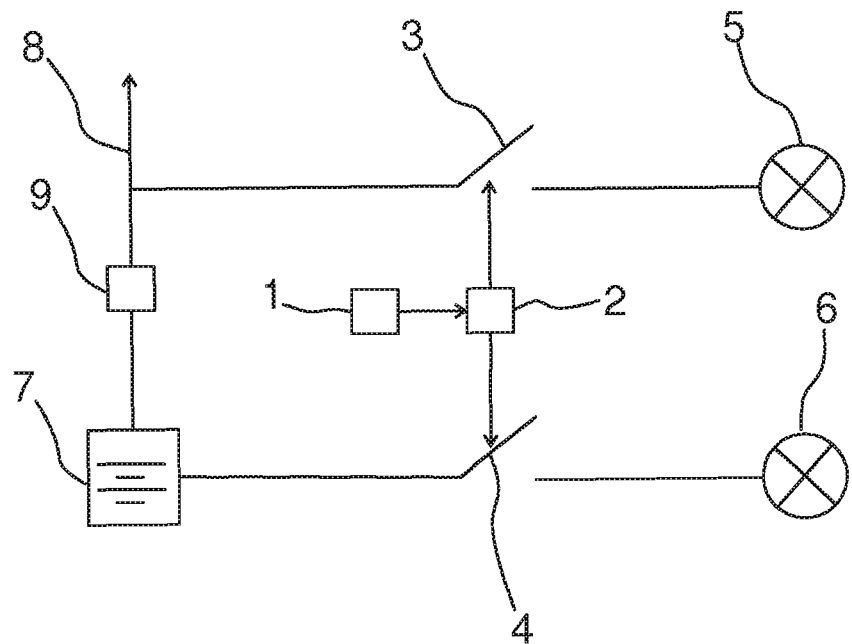
FIG. 4a presents as a circuit diagram a control arrangement according to the invention
Figure 4B:
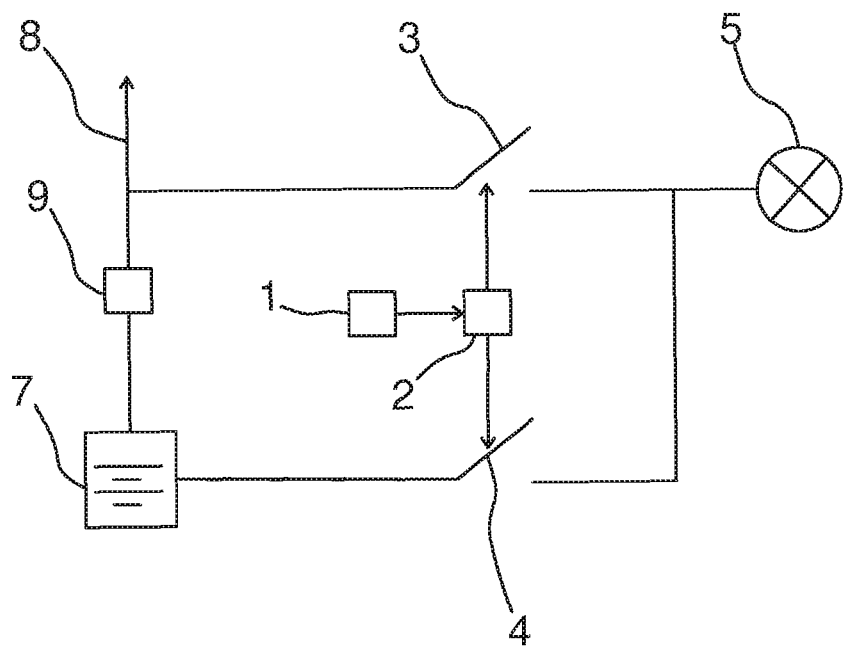
FIG. 4b presents as a circuit diagram a second control arrangement according to the invention

FIG. 2 illustrates the control unit 10 used in the embodiment of FIG. 1. FIGS. 4a and 4b further present in more detail two alternative circuit diagrams of the control unit 10 of FIG. 2. The control unit 10 comprises connectors, containing a connection to the supply cables of the reserve power source 7, to the supply cables of the electricity network 8, to the emergency luminaire 6 of the elevator car, and also to the interior luminaire 5 of the elevator car. The control unit 10 comprises a microprocessor 2 and also a memory 14, in which software to be executed is stored. An acceleration sensor 1 is fitted to the control unit in connection with the microprocessor 2 for detecting movement of the elevator car. In addition, a switch arrangement is fitted to the control unit 10, with which switch arrangement the power supply to the lighting of the elevator car is controlled. In the embodiment of FIG. 4 the elevator car 11 comprises an interior luminaire 5 of the elevator car and also an emergency luminaire 6, said luminaires being separate. A gas-discharge lamp is the interior luminaire 5 of the elevator car and a LED luminaire 6 of low energy consumption is the emergency luminaire. In the switch arrangement of FIG. 4a the microprocessor 2 is connected to the controllable switches 3, 4, of which with the first switch 3 electrical power is supplied from the electricity network 8 to the interior luminaire of the elevator car and with the second switch 4 electrical power is supplied from the battery 7 to the emergency luminaire 6. The battery 7 is charged from the electricity network 8 with a battery charger 9 when the electricity network 8 is in operating condition.

The control unit 10 comprises a measuring circuit 19, with which the voltage in the supply cables of the electricity network 8 is measured. The microprocessor 2 reads the voltage in the supply cables of the electricity network 8, and when it detects a voltage reduction/electricity outage the microprocessor switches the program to be executed to reserve power mode. In reserve power mode the power supply from the electricity network 8 to the interior luminaire 5 of the elevator car is disconnected by opening the switch 3, and after this the power supply from the battery 7 to the emergency luminaire 6 is started by closing the switch 4. When it detects that the voltage reduction/electricity outage has ceased, the microprocessor switches the program to be executed back to normal mode, in which case the power supply from the battery 7 to the emergency luminaire 6 is disconnected by opening the switch 4 and the power supply from the electricity network 8 to the interior luminaire 5 of the elevator car is restarted by closing the switch 3.

The microprocessor 2 also reads the measuring signal of the acceleration sensor 1. The microprocessor 2 switches the program to be executed to the energy-saving mode if the microprocessor has not detected on the basis of the measuring signal of the acceleration sensor 1 movement/vibration of the elevator car for a period of time of a set length. In energy-saving mode the microprocessor 2 disconnects the power supply to the interior luminaire of the elevator car by opening the controllable switch 3. When it again detects vibration/movement of the elevator car on the basis of the measuring signal of the acceleration sensor 1 the microprocessor deduces the arrival of an elevator passenger in the elevator car/the presence of an elevator passenger in the elevator car and switches the program, which is in energy-saving mode, back to normal mode, in which case the power supply from the electricity network 8 to the interior luminaire 6 of the elevator car is restarted by closing the switch 3.

Figure 3:
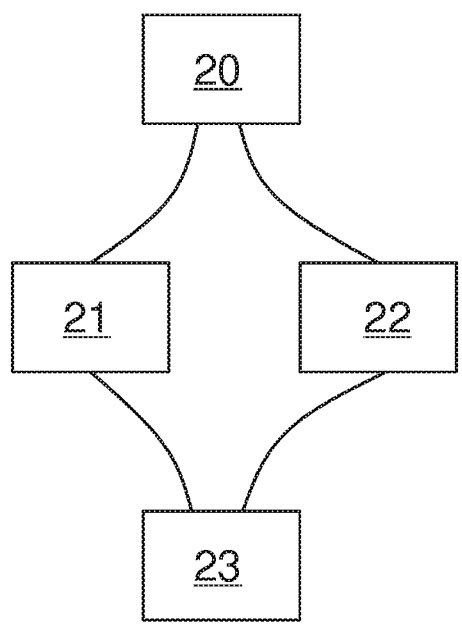
FIG. 3 presents as a state transition diagram a control method of a power supply according to the invention

For reducing the load of the battery the microprocessor can also switch to the combined mode of the program to be executed, in which simultaneously both reserve power mode and energy-saving mode are in force, according to the state transition diagram presented in FIG. 3. In normal mode 20 the electricity supply to the interior luminaire 6 occurs from the electricity network 8 in the manner presented above via the switch 3. Also the mode switch from the normal mode 20 either to the energy-saving mode 21 or to the reserve power mode 22 occurs in the manner presented above, in other words, the mode switch to reserve power mode 22 is determined on the basis of the voltage measurement of the electricity network 8 and the mode switch to the energy-saving mode is determined on the basis of the measuring signal of the acceleration sensor. Combined mode 23 is switched to when the selection criteria for both reserve power mode 22 and energy-saving mode 21 are in force at the same time. Therefore e.g. the program in the reserve power mode 22 is switched to combined mode 23, if the microprocessor has not detected on the basis of the measuring signal of the acceleration sensor 1 movement/vibration of the elevator car for a period of time of a set length, and the program in the energy-saving mode 21 is switched to combined mode 23, if the microprocessor 2 detects a voltage reduction/electricity outage in the supply cables of the electricity network 8. In the combined mode the microprocessor 2 disconnects the electricity supply both to the interior luminaire 5 and also to the emergency luminaire 6 by controlling the switches 3 and 4 open, in which case the load of the battery 7 substantially decreases.

The microprocessor 2 switches the program to be executed from the combined mode 23 to the reserve power mode 22 when it detects that the selection criterion for energy-saving mode 21 has ceased, in other words, when it again detects movement/vibration of the elevator car on the basis of the measuring signal of the acceleration sensor 1. In the reserve power mode the power supply from the battery 7 to the emergency luminaire 6 is started by again closing the switch 4.

The microprocessor 2 switches the program to be executed from the combined mode 23 to the energy-saving mode 21 when it detects that the selection criterion for reserve power mode 22 has ceased, in other words, when it detects that the voltage in the supply cables of the electricity network 8 has returned back to the normal magnitude.

The microprocessor 2 switches the program to be executed from the combined mode 23 back to the normal mode 20 when it detects that both the selection criterion for reserve power mode 22 and the selection criterion for energy-saving mode 21 have ceased.

The circuit diagram of the control unit 10 presented in FIG. 4b differs from the circuit diagram presented in FIG. 4a such that in the solution according to FIG. 4b the same, preferably LED, luminaire is used in the elevator car both in normal operation and as an emergency luminaire. In this case in the normal mode 20 the electricity supply to the luminaire 5 of the elevator car occurs from the electricity network 8 by closing the switch 3. In this case the switch 4 is controlled open and the battery 7 is isolated from the power supply circuit of the luminaire 5. In reserve power mode 22 the electricity supply to the luminaire 5 occurs from the battery 7 by closing the switch 4; in this case the electricity network 8 is isolated from the power supply circuit of the luminaire 5 by controlling the switch 3 open.

In the switch arrangement according to the invention, mechanical switches, such as relays or contactors, can be used as the controllable switches 3, 4. Also controllable solid-state switches, such as SCR switches, IGBT transistors, MOSFET transistors or corresponding, can be used as switches. In addition to, or instead of, a switch, the power supply of the lighting of the elevator car can be adjusted e.g. with an AC/DC converter, particularly when supplying power to a LED luminaire.

The battery 7 used as a reserve power source can be e.g. a lead-acid battery, a nickel-cadmium battery, a nickel-metal-hydride battery, a lithium-ion battery or a lithium-polymer accumulator.

The solution according to the invention can also be applied in connection with e.g. travelators, moving ramps and escalators, as well as in connection with elevators.

By means of the invention also many other such types of electrical devices of an elevator system can be controlled in addition to, or instead of, the lighting of an elevator car 11, to which devices the electricity supply occurs from a reserve power source 7 during a functional nonconformance of the electricity network 8. These types of devices can be e.g. the lighting of an elevator hoistway and also various control devices, such as an emergency drive apparatus, access control apparatus, et cetera.

The invention is described above by the aid of a few examples of its embodiment. It is obvious to the person skilled in the art that the invention is not only limited to the embodiments described above, but that many other applications are possible within the scope of the inventive concept defined by the claims.

The invention claimed is:

1. A control arrangement, comprising:
a sensor detecting movement of an elevator car; and
a control of the lighting of the elevator car,
wherein the control of the lighting of the elevator car is configured to control the emergency lighting of the elevator car on the basis of movement data of the elevator car expressed by the sensor detecting movement of the elevator car.

2. The control arrangement according to claim 1, wherein the control of the lighting of the elevator car is configured to control the interior lighting of the elevator car on the basis of movement data of the elevator car expressed by the sensor detecting movement of the elevator car.

3. The control arrangement according to claim 1, wherein the sensor detecting movement of the elevator car is an acceleration sensor, which is fitted in connection with the elevator car.

4. The control arrangement according to claim 1, wherein the control arrangement comprises a device configured to determine the operating state of the primary electricity supply of the elevator car.

5. The control arrangement according to claim 4, wherein the control of the lighting of the elevator car is configured to control the lighting of the elevator car on the basis of the operating state of the primary electricity supply of the elevator car.

6. The control arrangement according to claim 1, wherein a reserve power source is fitted in connection with the emergency lighting of the elevator car.

7. The control arrangement according to claim 6, wherein the control arrangement comprises a charging circuit for charging the reserve power source during normal operation of the primary electricity supply of the elevator car.

8. The control arrangement according to claim 6, wherein the control of the lighting is configured to control the power supply occurring to the emergency lighting of the elevator car from the reserve power source on the basis of movement data of the elevator car expressed by the sensor detecting movement of the elevator car.

9. A control unit, comprising:
a connection to a reserve power source;
a connection to a primary electricity supply of an elevator car;
a sensor detecting movement of the elevator car;
a control of the lighting of the elevator car; and
a connection to emergency lighting of the elevator car,
wherein the control of the lighting of the elevator car is configured to control the emergency lighting of the elevator car on the basis of movement data of the elevator car expressed by the sensor detecting movement of the elevator car.

10. The control unit according to claim 9, wherein the control unit comprises a connection to interior lighting of the elevator car,
wherein the control of the lighting of the elevator car is configured to control the interior lighting of the elevator car on the basis of movement data of the elevator car expressed by the sensor detecting movement of the elevator car.

11. The control unit according to claim 9, wherein the control unit comprises a device configured to determine the operating state of the primary electricity supply of the elevator car.

12. The control unit according to claim 11, wherein the control of the lighting of the elevator car is configured to control the lighting of the elevator car on the basis of the operating state of the primary electricity supply of the elevator car.

13. A method for modernizing an elevator, comprising the step of fitting a control unit according to claim 9 in connection with the elevator car for controlling the lighting of the elevator car.

14. A method, comprising the steps of:
measuring the movement of an elevator car;
controlling the emergency lighting of the elevator car on the basis of the measured movement of the elevator car.

15. The method according to claim 14, that further comprising the step of:
controlling the interior lighting of the elevator car on the basis of the measured movement of the elevator car.

16. The method according to claim 14, that further comprising the steps of:
determining the operating state of the primary electricity supply of the elevator car; and
controlling the lighting of the elevator car on the basis of the operating state of the primary electricity supply of the elevator car.

17. The method according to claim 16, wherein, when determining a functional nonconformance of the primary electricity supply of the elevator car, said method comprises the steps of:
disconnecting the power supply to the interior lighting of the elevator car; and
starting the power supply to the emergency lighting of the elevator car.

18. A method for controlling the power supply in an elevator system, which can be brought into normal mode, into energy-saving mode and into reserve power mode on the basis of selection criteria, wherein the method comprises the step of bringing the elevator system into combined mode, in which simultaneously both reserve power mode and energy-saving mode are in force, when it is detected that both the selection criterion for reserve power mode and the selection criterion for energy-saving mode are fulfilled.

19. The method according to claim 18, further comprising the step of supplying electrical power to the lighting of the elevator car.

20. The method according to claim 18, further comprising the step of switching the elevator system from combined mode to reserve power mode when it is detected that the selection criterion for energy-saving mode has ceased.

21. The method according to claim 18, further comprising the step of switching the elevator system from combined mode to energy-saving mode when it is detected that the selection criterion for reserve power mode has ceased.

22. The method according to claim 18, further comprising the step of switching the elevator system to normal mode when it is detected that both the selection criterion for reserve power mode and the selection criterion for energy-saving mode have ceased.

* * * * *